June 30, 1925.

H. A. HANDS 1,543,710

HEATER CONTROL SYSTEM

Filed April 18, 1922    2 Sheets-Sheet 1

WITNESSES:

INVENTOR
Howard A. Hands.
BY
ATTORNEY

Patented June 30, 1925.

1,543,710

UNITED STATES PATENT OFFICE.

HOWARD A. HANDS, OF SWISSVALE, PENNSYLVANIA, ASSIGNOR TO WESTINGHOUSE ELECTRIC & MANUFACTURING COMPANY, A CORPORATION OF PENNSYLVANIA.

HEATER-CONTROL SYSTEM.

Application filed April 18, 1922. Serial No. 555,142.

*To all whom it may concern:*

Be it known that I, HOWARD A. HANDS, a citizen of the United States, and a resident of Swissvale, in the county of Allegheny and State of Pennsylvania, have invented a new and useful Improvement in Heater-Control Systems, of which the following is a specification.

My invention relates to control systems and particularly to temperature-control systems for maintaining the temperature of an electric furnace, or the like, within a predetermined range of temperature.

One object of my invention is to maintain the temperature of a furnace within a predetermined range of temperature.

Another object of my invention is to provide means whereby the temperature of an electric furnace may be quickly increased from a cold condition to a predetermined maximum temperature after which the temperature of the furnace is maintained within a predetermined range.

A further object of my invention is to provide means whereby the heat-developing means embodied in the furnace may be caused to develop a large amount of heat when the heating of the furnace is commenced from cold condition in the furnace until a predetermined temperature is attained after which the devices are controlled to develop a smaller amount of heat to maintain the temperature of the furnace within a predetermined range of temperature.

In practicing my invention, I provide a plurality of resistors or heating units that may be connected in parallel relation to an energizing circuit when the operation of the furnace is commenced from cold condition in the furnace. After sufficient heat has been developed in the furnace to increase the temperature thereof to a predetermined maximum temperature, the connections are so changed as to connect the resistors in series relation to the energizing circuit and thereby to develop less heat. The heaters are then controlled to maintain the temperature of the furnace within the predetermined range.

The three figures in the accompanying drawings are diagrammatic views of electrical circuits containing apparatus of different types arranged to constitute temperature-control circuits embodying my invention.

Figure 1:
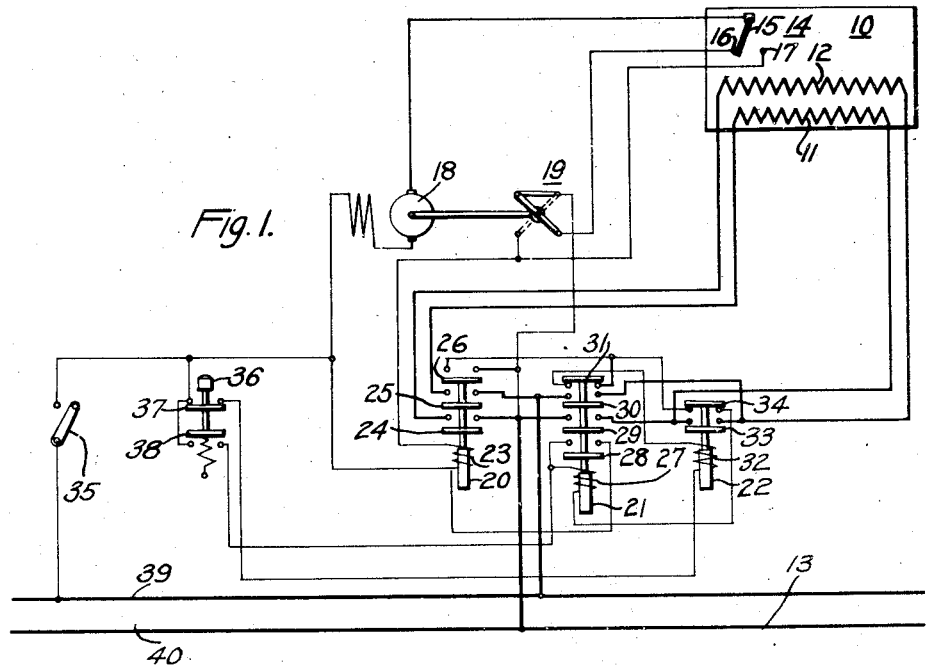

As illustrated in Fig. 1, a furnace 10, or the like, comprises two heating elements 11 and 12 that are adapted to be connected to an energizing circuit 13 in different circuit relations, depending upon the temperature within the furnace 10.

A thermostat 14 is disposed in such relation to the furnace 10 as to be subjected to the temperature thereof and comprises a thermally-responsive element 15 that is adapted to engage either of two contact members 16 and 17 under predetermined conditions. The contact member 16 is engaged when the temperature of the furnace is relatively low or cold, and the contact member 17 is engaged when the temperature of the furnace attains, or exceeds, a predetermined maximum temperature.

As the temperature within the furnace changes to cause the thermostat 14 to effect engagement between the different contact members, an operating circuit is completed to energize the motor 18 of a motor-operated snap switch 19. The switch controls the circuits of the operating coils of a plurality of electromagnetic switches that serve to connect the resistors 11 and 12 to the energizing circuit 13 in accordance with the temperature conditions prevailing in the furnace.

The resistors are connected to the energizing circuit by means of three electromagnetic switches 20, 21 and 22. The switch 20 comprises an operating coil 23 and three switches 24, 25 and 26, respectively, all of which are closed when the operating coil 23 is energized. The switch 21 similarly comprises an operating coil 27 and three switches 28, 29 and 30 that are closed when the coil 27 is energized, and a switch 31 that normally is closed but is opened upon the energization of the coil 27. The switch 22 comprises an operating coil 32, a switch 33 that is closed when the coil is energized and a switch 34 that is open when the switch is energized.

The operation of the control apparatus for automatically controlling the temperature of the furnace is begun and controlled by a main control switch 35 and a two-pole push-button switch 36. The push-button switch 36 comprises a switch 37 that normally is closed and a switch 38 that normally is open. When the push-button 36 is operated, the switch 38 is closed and the switch 37 is opened.

When beginning the operation of the furnace, the switch 35 is closed and the push-button switch 36 is depressed to close the switch 38. A circuit is thereupon completed from the conductor 39 of the energizing circuit 13 through the switch 35, the motor 18 and the movable member 15, the contact member 16 of the thermostat 14 and the blade of the motor-operated switch 19, in the position illustrated, to the conductor 40 of the circuit 13. The motor is thereupon energized to actuate the switch 19 to the position that is illustrated by the broken lines.

The actuation of the switch 19 to the broken-line position completes a circuit from the conductor 39 through the switch 35, the operating coil 23 of the relay 20 and the switch 19, in the broken-line position, to the conductor 40, thereby energizing the switch 20 to close its switches 24, 25 and 26.

Immediately upon the operation of the relay 20 and the closing of its switch 26, another circuit is completed from the conductor 39 through the switch 35, the switch 38 of the push-button switch, which is in its depressed position, being held there by the operator, the operating coil 27 of the relay 21, the switch 34 of the relay 22 and the switch 26 of the relay 20 to the conductor 40. The relay 21 is thereupon actuated to close its switches 28, 29 and 30 and to open its switch 31. The switch 28, when closed, parallels the switch 38 of the push-button switch 36 to maintain a holding circuit for the coil 27, and the switch 36 may thereupon be released.

By tracing the circuits from the energizing circuit 13 through the resistors 11 and 12, it will be observed that the resistors 11 and 12 are connected in parallel relation to the circuit 13. A maximum amount of heat is thereby developed in the resistors 11 and 12, and the temperature of the furnace may be quickly increased to the maximum temperature at which it is to operate. The thermostat element 14 thereupon will be caused to engage the contact member 17.

Upon engagement of the thermally-responsive member 15 and the contact member 17, when the temperature of the furnace attains its predetermined maximum value, a circuit is again completed that effects the energization and subsequent operation of the motor. The circuit may be traced from conductor 39 through the switch 35, the motor 18, the thermostat element 14 and the contact member 17 and the switch 19, in the broken-line position, to the conductor 40. The motor 18 is thereupon energized to actuate the switch 19 to the full-line position that is illustrated.

The switch 19, when actuated, opens the circuit of the operating coil 23 of the relay 20, whereupon its switches are permitted to open, and the relay 21 is also then permitted to assume its normal position since the circuit of the coil 27 is opened by the switch 26 of the relay 20. The resistors are now disconnected from the energizing circuit 13.

As the temperature of the furnace gradually decreases the minimum value of the predetermined range within which the temperature is to be maintained, engagement is effected between the thermally-responsive element 15 of the thermostat and the contact member 16. The operating circuit of the motor is thereupon completed and the motor is energized to actuate the switch 19 to the broken-line position. The relay 20 is immediately closed, as previously outlined.

The switch 26 of the relay 20 thereupon completes the circuit of the operating coil 32 of the relay 22 from the conductor 39 through the switch 35, the switch 37, the operating coil 32, the switch 31 of the relay 21 and the switch 26 of the relay 20 to the conductor 40. The relay 22 thereupon is actuated to close the switch 33 and to open the switch 34. The resistors 11 and 12 are now connected in series, as may be seen by tracing a circuit from the conductor 39 through the switch 25, the resistor 11, the switch 33, the resistor 12 and the switch 24 to the conductor 40.

Heat is now developed in the resistors 11 and 12 that tends to increase the temperature of the furnace 10. If the amount of heat that is developed by the resistors 11 and 12 exceeds the amount of heat that is removed and dissipated from the furnace 10, as will ordinarily be the case, the temperature of the furnace will gradually attain the predetermined maximum temperature beyond which further increase in the temperature is undesirable. The thermostat 14 will thereupon effect engagement between the member 15 and the contact member 17 to again energize the motor to actuate the switch 19 to the full-line position that is illustrated in the drawing. The resistors will thereupon be disconnected from the furnace until the temperature decreases to the predetermined minimum temperature, whereupon the resistors will be reconnected to maintain the temperature of the furnace.

Thus, when the operation of the furnace is begun from relatively cold condition, the resistor elements are connected in parallel relation to develop a relatively large amount of heat to quickly develop the operating temperature within the furnace, after which the development of the heat is controlled to merely maintain the temperature within the predetermined operating range.

Although I have shown the operating circuits of the control equipment to be energized from the circuit 13, it is obvious that an auxiliary control circuit may be used. I have illustrated the one circuit, both as a control and an energizing circuit, merely for convenience.

Figure 2:
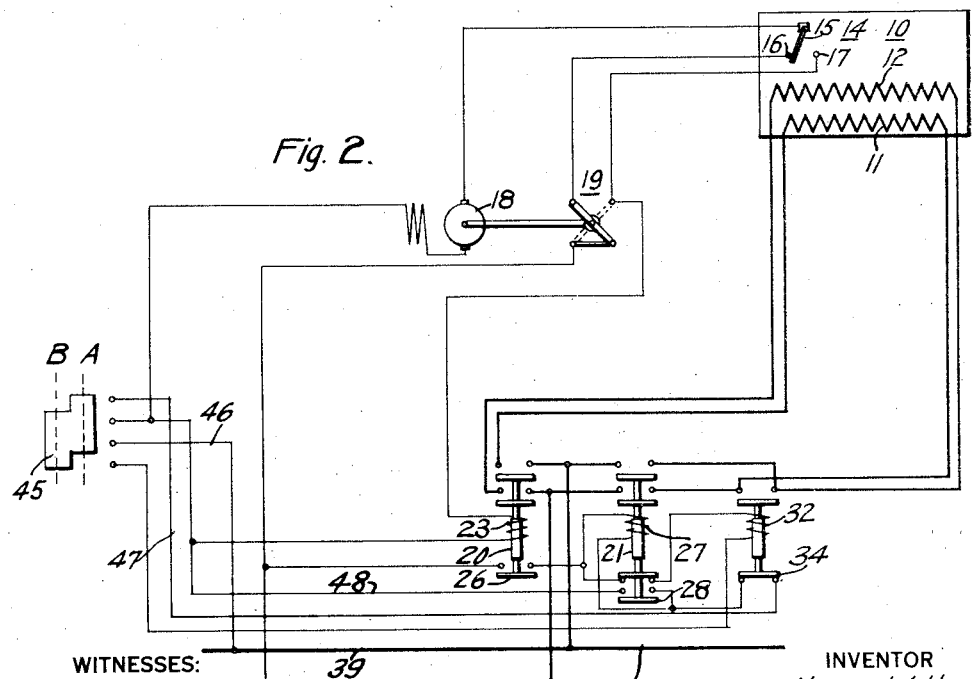

In the circuit that is illustrated in Fig. 2 of the accompanying drawings, I provide a single control switch 45, having two positions A and B, in lieu of the switches 35 and 36 that are illustrated in Fig. 1. When the switch 45 is moved to position A, a circuit is completed from the conductor 39 through conductor 46, the switch 45, the motor 18, the thermostat 14 and the switch 19 to conductor 40, thereupon energizing the motor to actuate the switch 19 to the broken-line position.

The circuit of the operating coil 23 of the relay 20 is thereupon completed from the conductor 39 through the conductor 46, the switch 45, the operating coil 23 and the switch 19 to the conductor 40. The relay 20 is thereupon operated to close its switches. The switch 26, when closed, completes the circuit of the operating coil 27 from conductor 39 through conductor 46, the switch 45, conductor 47, switch 34, operating coil 27 and switch 26 to conductor 40. The relay 21 is thereupon operated to actuate its switches. The closing of switch 28 completes the holding circuit for the coil 27 through the conductor 48 and the switch 45. The relays 20 and 21, when operated, connect the resistors in parallel relation, as previously explained, whereupon the switch 45 may be moved to position B.

When the temperature of the furnace attains the predetermined maximum value, the resistors are disconnected from the circuit 13, as previously outlined in connection with Fig. 1. When the temperature decreases to the predetermined minimum value of the operating range, the motor-operated snap switch is again actuated to complete the circuit of the operating coil 23, whereupon the relay switch 20 is actuated. The circuit of the operating coil 32 is thereupon completed through the switch 45, instead of the circuit of the operating coil 27, as was explained in connection with Fig. 1 with reference to the push-button switch 36. The subsequent operation of the system is the same as that outlined for the system shown in Fig. 1.

Figure 3:
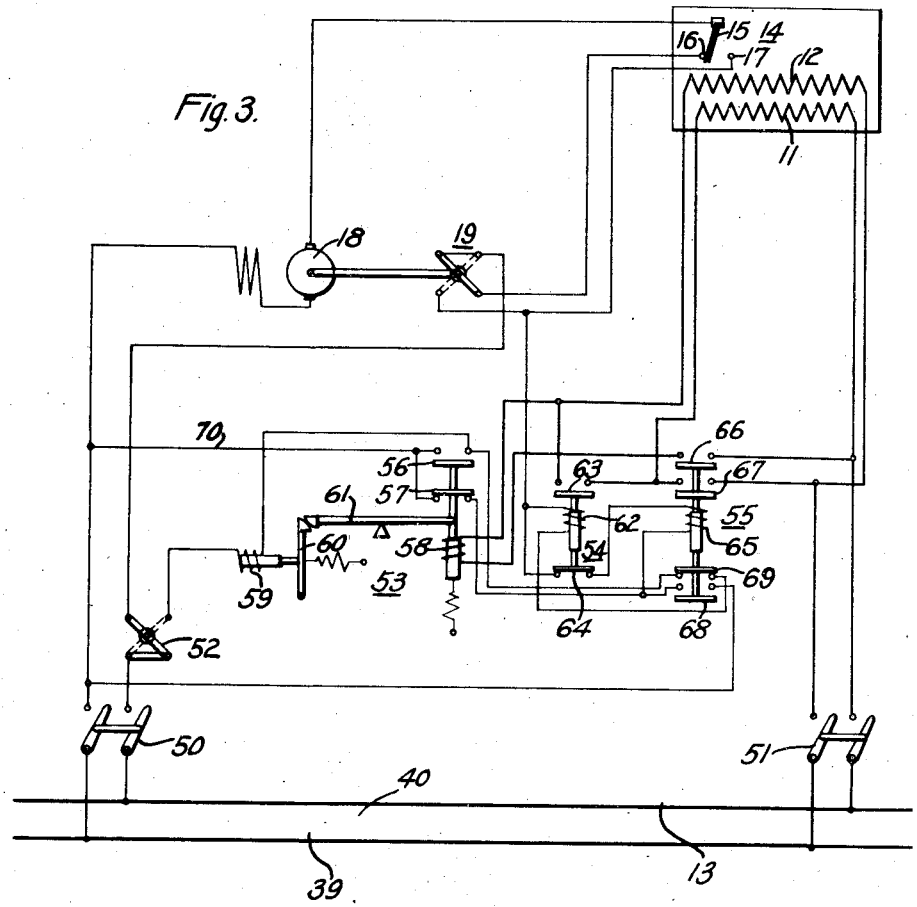

In Fig. 3, I show another modification of the control circuit embodying my invention in which apparatus of different type is employed to perform the same operations that were performed by the circuits previously described.

The control apparatus comprises, in addition to the thermostat and the motor-operated snap switch, two double-pole single-throw switches 50 and 51, a two-position snap switch 52, a transfer relay 53 and two electromagnetic switches 54 and 55.

The relay 53 comprises two switches 56 and 57, an operating coil 58 and a reset coil 59. The switch 56 is normally open and the switch 57 is normally closed. Upon the energization of the operating coil 58, the switch 56 is closed and the switch 57 is open and then maintained in such position, by means of the latching member 60, which restrains the pivoted switch-control member 51 in such position until actuated to release the same by means of the reset coil 59.

The electromagnetic switch 54 comprises an operating coil 62 and two switches 63 and 64, respectively. The switch 63 is normally open and switch 64 is normally closed. Both switches are actuated to opposite positions when the coil 62 is energized.

The switch 55 comprises an operating coil 65 and three switches 66, 67 and 68 that normally are open and a switch 69 that normally is closed. When the winding 65 is energized, the switches are actuated to the opposite positions.

In starting the operation of the system that is shown in Fig. 3, the double-throw switches 50 and 51 are closed, whereupon a circuit is completed from the conductor 39 through the switch 50, the motor 18, the thermostat 14 in the illustrated position, the switch 19 in the illustrated position, the two-position snap switch 52 in its illustrated position and the switch 50 to the conductor 40. The motor-operated switch 19 is thereupon actuated to its broken-line position. The circuit of the operating coil 65 of the relay switch 55 is thereupon energized from the conductor 39 through the switch 50, the conductor 70, the switch 57, the operating coil 65, the switch 64 and the switches 19 (in broken-line position), 52 (in full-line position) and 50 to conductor 40. The relay 55 is thereupon operated to actuate its switches.

The resistors 11 and 12 are thereupon connected in parallel relation to the circuit 13 as may be observed by tracing the circuit of the resistors from conductor 40 through switch 51, resistor 11, switch 67 and switch 51 to conductor 39. The circuit of the resistor 12 may be traced from the conductor 39 through switch 51, the resistor 12, the operating coil 58 of the transfer relay 53, the switch 66 of the relay 55 and the switch 51 to the conductor 40.

It will be observed that the circuit of the resistor 12 includes the operating coil 58 of the transfer relay 53. The transfer relay 53 is therefore actuated immediately after the actuation of the relay 55, whereupon the switch 57 is opened and the switch 56 is closed. The relay 55 is retained in its operative position, however, since the switch 68, when closed, maintains the holding circuit for the operating coil 65.

When the temperature of the furnace attains a maximum value, the switch 19 is operated to its full-line position. The circuit of the operating coil 65 is thereupon opened and the relay permitted to assume its open position, as illustrated.

When the temperature of the furnace decreases to the minimum value, the motor-operated snap switch 19 is again actuated to its broken-line position, but instead of completing the circuit of the operating coil 65, the circuit of the operating coil 62 is now completed by reason of the switch 56 of the transfer relay being closed and the switch 57 being open.

The circuit of the operating coil 62 may be traced from the conductor 39 through the switch 50, the conductor 70, the switch 56, the switch 69, the operating coil 62 and the switches 19 (broken-line position), 52 (full-line position) and 50 to conductor 40. The relay 54 is thereupon actuated to close switch 63 and to open switch 64.

The switch 63 joins the left hand terminals of the resistors 11 and 12 and, since the right-hand terminals of the resistors are respectively connected to the conductors 39 and 40, the two resistors are connected in series across the circuit 13. The operation of the system will now continue as previously outlined with relation to the systems shown in Figs. 1 and 2.

When it is desired to reset the transfer relay 53, the reset coil 59 may be energized by means of the snap switch 52, whereupon the transfer relay 53 assumes its normal position, which is illustrated, and the circuit of the reset coil 59 is opened at the switch 56. The snap switch 52 is then actuated to its full-line position. When it is desired to stop the operation of the furnace, the switches 50 and 51 are opened.

From the foregoing, it will be seen that my invention contemplates the development of a relatively large amount of heat in a furnace when beginning its operation from cold condition, and the subsequent development of a relatively small amount of heat, after the predetermined temperature is obtained, whereby the temperature of the furnace may be maintained within a predetermined range of temperature.

As I have illustrated, my invention may be practiced by means of apparatus of different types arranged in various manners to perform the same result. It is therefore obvious that many changes may be made in such arrangement without departing from the scope of my invention, as set forth in the appended claims.

I claim as my invention:

1. In a furnace heating-control system, the combination with a plurality of heating devices, of means for controlling said devices to develop the maximum amount of heat, when the furnace is started from cold condition, to heat the furnace to the maximum temperature to be attained thereby, and then controlling such heat development to maintain the temperature of the furnace between two predetermined limits and means heated in accordance with the temperature of the furnace for controlling said controlling means.

2. In an electric furnace heating-control system, the combination with a plurality of heating elements and switching means for connecting the elements to an electric circuit, of means for effecting the connection of the resistors in parallel relation to the circuit when the temperature of the furnace is below a predetermined value, changing such connection to one of series relation when a predetermined maximum temperature is attained and then opening and closing such connection to maintain the temperature of the furnace between two predetermined limits.

3. In an electric furnace, the combination with two heater elements, two switches for connecting the elements in parallel relation to an electric circuit and a third switch for co-operating with one of said two switches to connect the heater elements in series relation to the circuit, of a single switch for controlling the initial actuation of said switches and a thermostat for controlling the subsequent actuation to maintain the temperature of the furnace between two predetermined limits.

4. In an electric furnace, the combination with a plurality of heater elements and an electric circuit, of a switch for connecting said elements to the circuit in parallel relation, a second switch for connecting the elements to the circuit in series relation, means for closing the first switch, a thermostat, and means actuated, when the first switch is actuated, to such position that it cooperates with the thermostat in a predetermined position to control the actuation of the second switch.

5. In an electric furnace, the combination with a plurality of heater elements and an electric circuit, of a switch for connecting said elements to the circuit in parallel relation, a second switch for connecting the elements to the circuit in series relation, a source of control energy, means for effecting the actuation of the first switch, means controlled by the first switch for transferring the control to the second switch and a thermostat for rendering such control effective at a predetermined temperature.

6. In an electric furnace, the combination with a plurality of heater elements and an electric circuit, of a switch for connecting said elements to the circuit in parallel relation, a second switch for connecting the elements to the circuit in series relation, a source of control energy, a transfer switch for transferring the control from one to the other switch to actuate the same, after the actuation of the first main switch and temperature-responsive means for controlling the effectiveness of the transfer switch.

7. In an electric furnace, the combination with a plurality of heater elements and an electric circuit, of a switch for connecting said elements to the circuit in parallel relation, a second switch for connecting the elements to the circuit in series relation, a source of control energy, a transfer switch for transferring the control from one to the other switch to actuate the same and means for resetting the transfer switch.

8. In an electric furnace, the combination with a plurality of heater elements and an electric circuit, of switching means for connecting said elements to the circuit in parallel relation and for connecting the elements to the circuit in series relation, and means directly exposed to the thermal energy dissipated from the heater elements for controlling the switching means.

In testimony whereof, I have hereunto subscribed my name this 17th day of April 1922.

HOWARD A. HANDS.